Patented June 12, 1945

2,377,870

UNITED STATES PATENT OFFICE 2,377,870

ORGANIC PHOSPHORUS ABIETATES AND
PROCESS OF MANUFACTURE

Ernest F. Engelke, Merchantville, N. J., assignor
to Cities Service Oil Company, New York, N. Y.,
a corporation of Pennsylvania No Drawing. Original application January 8,
1942, Serial No. 425,965. Divided and this application December 15, 1942, Serial No. 469,126

6 Claims. (Cl. 260—97)

This invention relates to the manufacture of improved organic phosphorus compounds. More particularly the invention relates to improved phosphorus organic compounds made from the esters of abietic acid. This application is a division of pending application Serial No. 425,965, filed January 8th, 1942.

Many of the esters of abietic acid are commercial products as shown by the fact that Patent No. 2,217,764 has been granted to Morway for their use in the manufacture of sulfurized materials to be used in cutting oils and in lubricants generally.

The primary object of the present invention is to provide improved phosphorus derivatives of the esters of abietic acid.

Another object of the invention is to provide an improved process of the manufacture of phosphorus abietates.

With these objects in view, the present invention includes improved phosphorized abietic esters or phosphorus esters containing an organic abietic acid ester as a substituent. In general, the compounds containing phosphorus may be made by chlorinating the abietate and reacting the chlorinated product with a phosphorus chloride in the presence of a Wurtz-Fittig catalyst such as sodium.

The phosphorus derivatives produced preferably contain one or more abietate groups attached to phosphorus by a phosphorus-carbon linkage. In carrying out the Wurtz-Fittig reaction, the initial organic phosphorus compounds used for reacting with the abietate may be represented by the general formula $(RO)_2PCl$, $(RO)PCl_2$, $(RO)_2PSCl$, and $(RO)PSCl_2$, in which "R" is an alkyl or aromatic group preferably phenyl or cresyl. If the abietic acid esters are represented generally by R', the chlorinated esters will have the general formula R'Cl, while the final products may be represented by the general formula $(RO)_2PR'$, $(RO)PR'_2$, $(RO)_2PSR'$ and $(RO)PSR'_2$, in which each R' is directly attached to phosphorus.

The method of manufacturing the improved phosphorus abietate esters and their effectiveness, for example as film strength agents, can be illustrated by reference to the following specific examples:

Example No. 1

According to a preferred form of the invention, a phosphite ester containing two phenol groups and a methyl abietate group is prepared by the following procedure:

The methyl abietate is first chlorinated by direct contact with chlorine at a temperature of about 180° C. until sufficient chlorine has been added to correspond to about one atom of chlorine for each molecule of methyl abietate. After the chlorination reaction the resulting product was diluted with two volumes of xylol and shaken with sufficient solid slaked lime to neutralize the product, after which it was filtered. The resulting chlorinated methyl abietate showed a chlorine content of 11.88%.

The primary reaction was carried out by first placing about twenty parts by weight of metallic sodium in 105 parts of xylol which is used as a solvent, and subjecting it to reflux heating with intense agitation, the heating being effected by means of an oil bath maintained at a temperature of about 320° F., so that the sodium and xylol are heated to a temperature of from 260° to 270° F. thereby effecting melting and intimate dispersion of the sodium. After the dispersion of the sodium in the xylol in extremely fine particles, a mixture of 250 parts by weight of diphenyl phosphorous acid chloride and 350 parts of chlorinated methyl abietate dissolved in about 250 parts of xylol was slowly added to the hot sodium dispersion while continuing the agitation and maintaining the temperatures. Upon completing the introduction of these materials, the temperature of the mixture was maintained at from about 270° to 280° F. for a period of several hours.

The resulting reaction mixture was filtered hot for the separation of the sodium chloride, the filter cake being washed twice with hot xylol. An additional but relatively small quantity of filtrate was obtained by digesting the filter cake with water which dissolved the sodium chloride. The resulting combined filtrate in xylol solution was alkaline but was made slightly acidic with hydrochloric acid and then washed with water until neutral. The resulting purified neutral product was separated from the xylol by steam distilling the latter finally at a reduced pressure of about 100 mm. of Hg. The finished product was a very viscous liquid of wine-red color in transmitted light and faint greenish dark color in reflected light. It contained 2.95% of phosphorus and was found to be readily soluble to the extent of 10% to 15% in motor oils.

The effectiveness of the product as a film strength agent in lubricating oils is illustrated by the fact that blends of 0.5, 1.0 and 1.5% dissolved in a Pennsylvania lubricating oil of 20 SAE number showed load-carrying capacities on the Timken testing machine of 27,400, 30,400 and 35,800 lbs. per square inch respectively. The load-carrying capacity of the Pennsylvania lubricating oil alone was only 14,100 lbs. per square inch. The motor oil blends were tested for wear and corrosion with various bearing metals such as Cd-Ag-Cu-steel, Cu-Pb-steel, babbit, etc. All bearings were bright, smooth, shiny and untarnished.

Example No. 2

A phosphite ester containing two cresyl groups and one methyl abietate group was made by the same procedure used above in Example No. 1. This product was also liquid and had about the same color characteristics as the product of Example No. 1, and contained 3.92% of phosphorus. It was blended in a 20 SAE Pennsylvania lubricating oil in the proportions of 0.5, 1.0 and 1.5 percentages, and the resulting blends tested on the Timken testing machine. The load-carrying capacities of these blends were respectively 30,500, 31,600 and 33,900 lbs. per square inch, whereas the particular lubricating oil alone carried only 15,150 lbs. per square inch.

Example No. 3

A thiophosphate ester was prepared by the procedure used in Example No. 1 by reacting dicresyl thiophosphoric acid chloride with chlorinated methyl abietate. The resulting product contained 3.88% of phosphorus, was a liquid, and had about the same color characteristics as the product of Example No. 1. Blends were made with a 20 SAE Pennsylvania lubricating oil stock containing 0.5, 1.0 and 1.5% of the thiophosphate ester. These blends showed load-carrying capacities on the Timken testing machine of 16,750, 29,000 and 30,500 lbs. per square inch respectively; while the oil alone carried only 15,150 lbs. per square inch.

The blends in this instance, as also in Example No. 2, were non-corrosive to the bearing metals referred to above, all of which remained smooth, shiny and bright.

Example No. 4

Chlorinated methyl dihydroabietate (10.58% Cl) was reacted with a diphenol phosphorous monochloride $(C_6H_5O)_2PCl$, under the conditions described in Example No. 1 to produce a product containing 4.30% of phosphorus and which had substantially the color characteristics of the product described in Example No. 1. Portions of the product were blended with a 20 SAE Pennsylvania lubricating oil stock in the proportions of 0.5, 1.0 and 1.5% and the blends showed load-carrying capacities on the Timken testing machine of 25,800, 29,400 and 31,500 lbs per square inch, respectively. The oil alone had a load-carrying capacity of 15,750 lbs. per square inch. In the bearing tests, the blends were non-corrosive and left the bearings smooth and bright with only a slight tarnish.

Example No. 5

Monocresyl phosphorous dichloride,

$CH_3.C_6H_4.O-PCl_2$ was reacted with chlorinated methyl dihydroabietate (10.58% Cl) under the conditions described in Example No. 1, to produce a phosphite believed to contain two of the abietate groups. The resulting product contained 2.47% of phosphorus and had the general characteristics of the product produced in Example No. 1, except that it was more viscous. The structure of the product is believed to be represented by the general formula $(RO)PR'_2$.

The effectiveness of this material as an extreme pressure agent is illustrated by the fact that blends of 20 SAE Pennsylvania lubricating oil containing 0.5, 1.0, and 1.5% of the product showed load-carrying capacities on the Timken testing machine of 31,400, 29,900 and 27,300 lbs. per square inch respectively; whereas, the oil alone showed a load-carrying capacity of only 16,550 lbs. per square inch. The tests of the blends on bearing metals showed very low losses, and most bearings remained shiny, smooth and bright, although the Cu-Pb-steel bearing showed a slight tarnish.

In addition to the abietates used in the foregoing examples, other esters may be employed in the manufacture of the improved compounds such as ethyl, propyl, butyl, amyl and other esters of either abietic acid or the dihydro compound. Aromatic esters may also be used as those of phenol, cresol, benzyl alcohol and the naphthols. Furthermore, the esters mentioned by Van Antwerpen in his article in the "News Edition" of the American Chemical Society for November 25, 1941, pages 1255, 1256 and 1258, may be employed. This article gives the properties of the methyl esters used in the foregoing examples. The esterification of abietic acid and the production of dihydroabietates results in compounds having pronounced differences from the original acid.

While it is believed that the reactions described above in connection with the examples, produce the compounds indicated, it may be that some proportions of other products are produced as for example by the combination of two molecules of the chlorinated abietate or the combination of two of the phosphite groups by a P-P linkage.

While metallic sodium is preferred in the Wurtz-Fittig reactions, it is believed that substantially the same results are obtainable by the use of lithium, potassium, finely divided silver, copper and zinc, these metals being of known utility in carrying out certain Wurtz-Fittig synthesis. Likewise, the abietate may be halogenated by other halogens than chlorine, particularly iodine and bromine.

While the invention has been described in connection with the manufacture of phosphites and thiophosphates, the simple phosphate derivatives may be made where the presence of sulphur is found undesirable. These phosphates may be produced by oxidizing the finished phosphite or by starting with $(RO)_2POCl$ or $(RO)POCl_2$. The resulting compounds will have the general formula $(RO)_2POR'$ and $(RO)POR'_2$ and $R'_3PO$, the R' being connected directly to phosphorus with a P-C linkage. The phosphates therefore will have the general formula $(RO)_2PXR'$ and $(RO)PXR'_2$, in which X is sulfur or oxygen.

The R substitute in the foregoing examples has been either phenyl or cresyl, but may represent any suitable aromatic hydrocarbon or aliphatic hydrocarbon radical, the latter preferably consisting of from four to seven carbon atoms. Any of these substituents may be halogenated.

While the foregoing invention has been described and illustrated in connection with the use of the improved compounds as addition agents for lubricating oils, it is to be understood that the invention contemplates their use for other purposes for which they are adapted, as for example, in making cutting oils, greases and flushing oils. Furthermore, the improved compounds may be used as addition agents for other oils such as fatty oils, synthetic oils and esters, since they are non-corrosive and resist heat, light and oxidation.

Having thus described the invention in its preferred form, what is claimed as new is:

1. A cresol ester of phosphorus containing an abietate substituent directly attached to the phosphorus of the ester with P-C linkage.

2. A phosphorus compound having the general formula $(RO)_2PR'$ wherein R represents a radical selected from the group consisting of alkyl radicals containing from 4 to 7 carbon atoms and aryl radicals containing a single phenyl ring, and R' represents an abietate directly attached to phosphorus with a P-C linkage.

3. A composition of matter comprising a Wurtz-Fittig reaction product of a halogenated abietate and a phosphorus halide having at least one RO-group attached to phosphorus in which R represents a radical selected from the group consisting of alkyl radicals containing from 4 to 7 carbon atoms and aryl radicals containing a single phenyl ring.

4. The process of manufacturing organic phosphorus compounds, which comprises reacting a mixture of a halogenated abietate and a phosphorus halide having at least one RO-group attached to phosphorus in which R represents a radical selected from the group consisting of alkyl radicals containing from 4 to 7 carbon atoms and aryl radicals containing a single phenyl ring, carrying out the reaction in the presence of sodium at a temperature of from 250° F. to 300° F., and separating the resulting phosphorus compound from the resulting sodium halide.

5. The process of manufacturing organic phosphorus compounds containing an alkyl abietate directly attached to phosphorus, which comprises dissolving in a mutual solvent a halogenated alkyl abietate and a phosphorus halide having at least one RO-group attached to phosphorus in which R represents a radical selected from the group consisting of alkyl radicals containing from 4 to 7 carbon atoms and aryl radicals containing a single phenyl ring, heating the resulting solution to a temperature of approximately 270° F., slowly mingling the solution with sodium until an excess of sodium has been mixed with the solution for the removal of the halide from the phosphorus halide and the halogenated abietate, separating the resulting sodium halide, neutralizing the remainder of the reaction mixture with acid, removing the solvent, and recovering the phosphorus compound.

6. A phenol ester of phosphorus containing an abietate substituent directly attached to the phosphorus of the ester with a P-C linkage.

ERNEST F. ENGELKE.